United States Patent [19]

Asami

[11] Patent Number: 5,327,214
[45] Date of Patent: Jul. 5, 1994

[54] OPTICAL INTERFEROMETRIC GYRO HAVING REDUCED RETURN LIGHT TO THE LIGHT SOURCE

[75] Inventor: Eiichi Asami, Hannoh, Japan

[73] Assignee: Japan Aviation Electronics Industry Limited, Tokyo, Japan

[21] Appl. No.: 848,967

[22] PCT Filed: Aug. 29, 1991

[86] PCT No.: PCT/JP91/01149
§ 371 Date: Apr. 24, 1992
§ 102(e) Date: Apr. 24, 1992

[87] PCT Pub. No.: WO92/04597
PCT Pub. Date: Mar. 19, 1992

[30] Foreign Application Priority Data

Aug. 31, 1990 [JP] Japan ............... 2-230822
Nov. 27, 1990 [JP] Japan ............... 2-324013

[51] Int. Cl.$^5$ ............................... G01C 19/72
[52] U.S. Cl. ............................ 356/350; 385/12
[58] Field of Search ................ 356/350, 345; 250/227.19, 227.27; 385/12, 14

[56] References Cited

U.S. PATENT DOCUMENTS 4,712,306 12/1987 Cahill et al. ............... 356/350
5,018,859 5/1991 Chang et al. .............. 356/350
5,018,860 5/1991 Bielas et al. .............. 356/350

FOREIGN PATENT DOCUMENTS 3123163 1/1983 Fed. Rep. of Germany.
3533695 3/1987 Fed. Rep. of Germany.
2100855 1/1883 United Kingdom.
2216652 10/1989 United Kingdom.

OTHER PUBLICATIONS

"Source Statistics And The Kerr Effect In Fiber-Optic Gyroscopes" by R. A. Bergh et al, Optics Letters, vol. 7, No. 11, pp. 563-565 (Nov. 1982).
"Fiber-Optic Rotation Sensor Technology" by W. C. Goss et al, SPIE Milestone Series, vol. MS8, pp. 160-166 (1980).

Primary Examiner—Samuel A. Turner
Attorney, Agent, or Firm—Pollock, Vande Sande & Priddy

[57] ABSTRACT

Light from a light source is provided to an optical coupler 14 via a beam splitter 25 having a 1:4 branching ratio and a polarizer 13. Two light beams split by the optical coupler 14 are provided as clockwise and counterclockwise light beams to both ends of an optical fiber coil 16 via phase modulators 15 and 26, respectively. In the phase modulator 15 said light beams are each phase modulated by a modulation signal $\phi(2\pi f_m t)$ and in the phase modulator 26 they are each phase modulated by a modulation signal $\phi(2\pi f_m t - 2\pi \tau f_m)$ (where $\tau$ is the time for light to propagate through the optical fiber coil 16). The two light beams having passed through the optical fiber coil 16 are combined by the optical coupler 14 to interfere with each other, and the resulting interference light is provided via the beam splitter 25 to a photodetector 21, the output of which is synchronously detected by the modulation signal. By this, an angular velocity applied to the optical fiber coil 16 about its axis is detected. A frequency component $f_m$ is removed from the intensity-modulated components produced by the phase modulators 15 and 26, eliminating an error in the bias value of an optical interferometric gyro and hence enhancing zero stability of its bias.

3 Claims, 8 Drawing Sheets

OPTICAL INTERFEROMETRIC GYRO HAVING REDUCED RETURN LIGHT TO THE LIGHT SOURCE

TECHNICAL FIELD

The present invention relates to an optical interferometric gyro in which light from a light source is split into two light beams, the light beams are provided as clockwise and counterclockwise light beams to both ends of a looped optical transmission line, the light beams entering and leaving the looped optical transmission line are phase shifted by a modulation signal of a phase modulator at one end of the optical transmission line, the two light beams emitted from the looped optical transmission line at both ends thereof are combined to interfere with each other, the resulting interference signal is converted into an electrical signal, and the electrical signal is synchronously detected by the modulation signal of the phase modulator to thereby detect an angular velocity applied to the looped optical transmission line about its axis.

BACKGROUND ART

Figure 1:
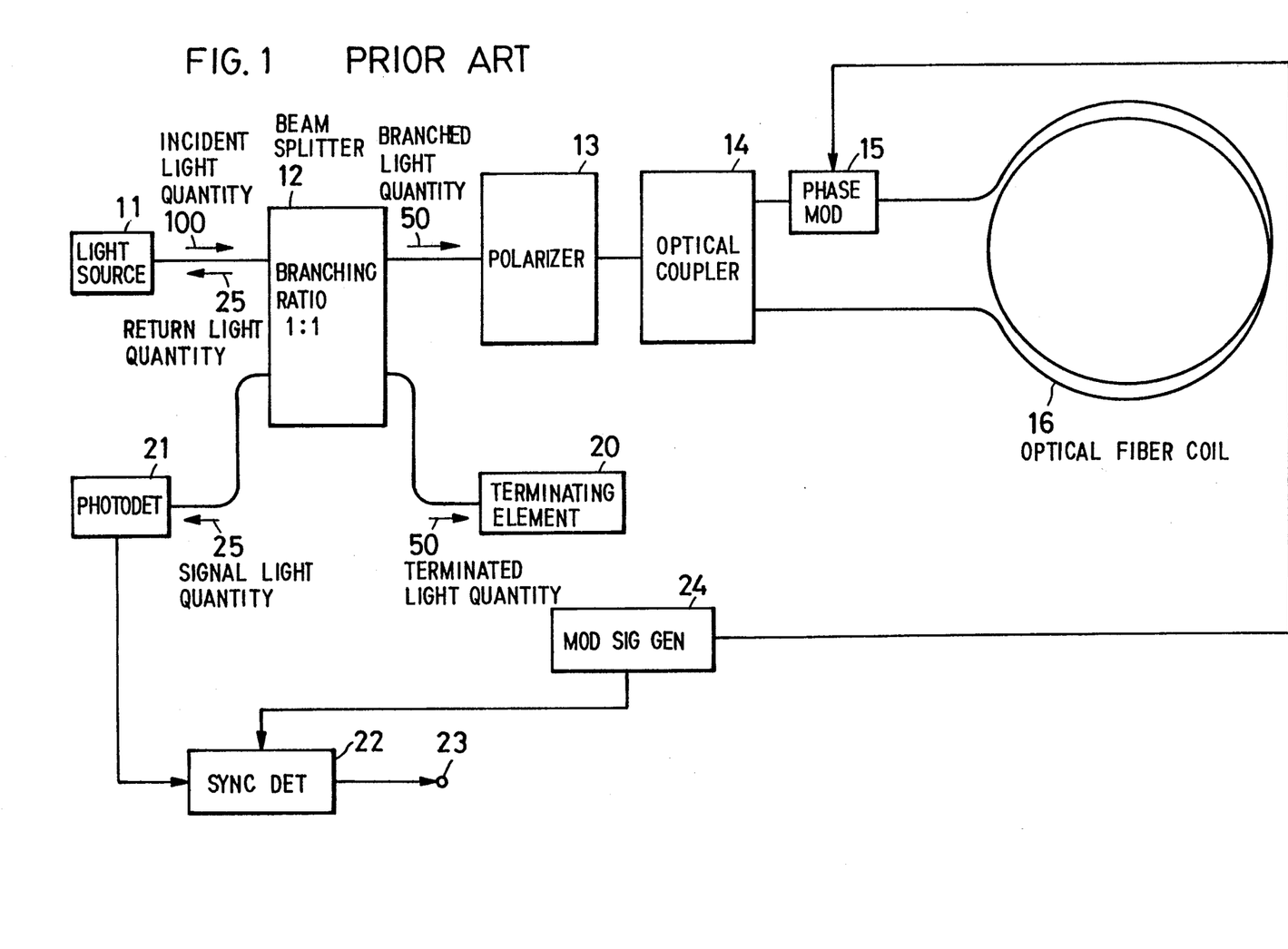
FIG. 1 is a block diagram for showing a conventional optical interferometric gyro.
Figure 2:
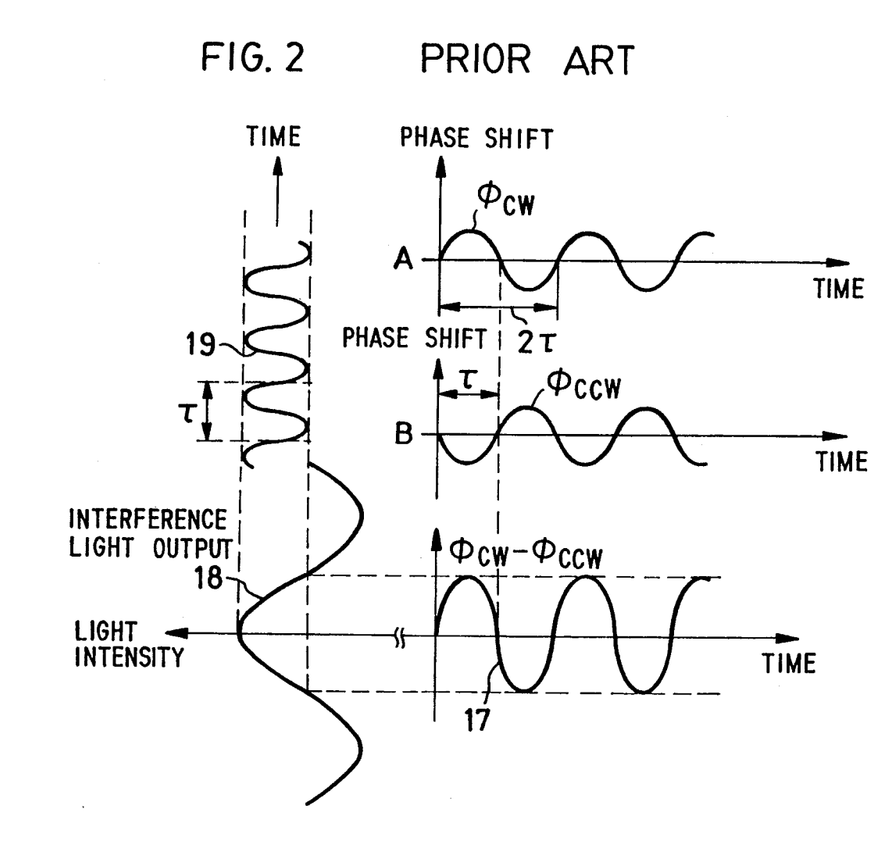
FIG. 2 is a diagram showing phase shifts imposed on clockwise and counterclockwise light beams, the phase difference between the two beams and a variation in the intensity of interference light into which both light beams are combined.

FIG. 1 shows a conventional optical interferometric gyro. Light emitted from a light source 11 is split by a beam splitter 12 into two, one of which is provided via a polarizer 13 to an optical coupler 14 and the other of which is terminated at a terminating element 20. The light beam led to the optical coupler 14 is split into clockwise and counterclockwise light beams. The clockwise light beam is phase modulated by a phase modulator 15 immediately after being emitted from the optical coupler 14, and is provided to one end of an optical fiber coil 16 used as a looped optical transmission line. The clockwise light beam reaches the optical coupler 14 again after propagating through the optical fiber coil 16 clockwise. On the other hand, the counterclockwise light beam is provided to the other end of the optical fiber coil 16 and, after propagating therethrough counterclockwise, it is phase modulated by the phase modulator 15, immediately thereafter reaching the optical coupler 14 again. In the optical coupler 14 the clockwise and counterclockwise light beams having propagated through the optical fiber coil 16 meet and interfere with each other. At this time, a periodic phase difference occurs between the clockwise and counterclockwise light beams because they have been subjected to periodic phase shifts by the phase modulator 15. Now, assume that the frequency $f_m$ of the modulation signal for driving the phase modulator 15 is, for example, $1/(2\tau)$ (where $\tau$ is the time for light to propagate through the optical fiber coil 16). In this instance, when the phase shift of the clockwise light beam is sinusoidal as shown in FIG. 2A when it has just returned to the optical coupler 14 after being subjected to a phase shift $\phi_{cw}$ by the phase modulator and then having propagated through the optical fiber coil 16, a phase shift $\phi_{ccw}$ to which the counterclockwise light beam is subjected in the phase modulator 15 lags behind the modulation signal of FIG. 2A by the time $\tau$, and hence is 180° out-of-phase with the phase shift $\phi_{cw}$ as depicted in FIG. 2B. Accordingly, the phase difference $\phi_{cw}-\phi_{ccw}$ between the clockwise and counterclockwise light beams, which are combined by the optical coupler 14, varies with a $2\tau$ period as indicated by the curve 17 in FIG. 2. In consequence, the two light beams, which are combined into the interference light, strengthen and weaken each other repeatedly with a period $\tau$, that is, the interference light varies its intensity with the period $\tau$. The intensity of the interference light varies with the phase difference $\phi_{cw}-\phi_{ccw}$ between the two light beams as indicated by the curve 18 in FIG. 2, and consequently, the intensity variation is repeated with the period $\tau$ as indicated by the curve 19.

In FIG. 1 the interference light from the optical coupler 14 is provided via the polarizer 13 to the beam splitter 12, wherein it is split into two beams, one of which is converted by a photodetector 21 into an electrical signal. This electrical signal becomes a signal which varies at a frequency twice higher than the phase modulation frequency $f_m$, i.e. $1/\tau$ in the example of FIG. 2.

When an angular velocity is applied to the optical fiber coil 16 about its axis, a phase difference corresponding to the input angular velocity is introduced between the clockwise and counterclockwise light beams by the Sagnac effect. As a result of this, the phase difference based on the input angular velocity is superimposed on the curve 17 in FIG. 2. When the phase difference is superimposed on the curve DC-wise, a component of the phase modulation frequency $f_m$ appears in the output electrical signal of the photodetector 21 in accordance with the DC-wise phase difference. The output of the photodetector 21 is provided to a synchronous detector 22, wherein it is synchronously detected by a reference signal of the same frequency as the phase modulation frequency $f_m$. When the input angular velocity is zero, the output of the photodetector 21 is only an even multiple component of the phase modulation frequency, mainly a twice component alone, and consequently, the output of the synchronous detector 22 is zero. When an angular velocity is input, a component of the same frequency as the phase modulation frequency $f_m$ is provided at the output of the photodetector 21, and an output of the polarity and level corresponding to the direction and magnitude of the input angular velocity is obtained from the synchronous detector 22 and is provided to an output terminal 23; thus, the input angular velocity can be detected. The phase modulation signal to be supplied to the phase modulator 15 and the reference signal to be supplied to the synchronous detector 22 are produced by a modulation signal generator 24.

When passing through the phase modulator 15, the light is subjected to intensity modulation as well as to phase shift by the modulation signal. The reason for this is as follows: The phase modulation is performed by changing the refractive index of the medium through which the light propagates, but when the refractive index of the medium varies, the confinement of light in the medium varies accordingly, so that the confinement of light in the medium varies in synchronism with the phase modulation signal and the intensity of light passing through the phase modulator 15 is modulated in synchronism with it.

Thus, the clockwise and counterclockwise light beams, which have passed through the phase modulator 15, are both intensity-modulated at the frequency $f_m$, and the interference light into which the thus intensity-modulated-clockwise and counterclockwise light beams have been combined again by the optical coupler 14 also contains the intensity-modulated component of the frequency $f_m$. On this account, even when the input angular velocity is zero, the component of the frequency $f_m$ is detected from the synchronous detector 22 and this becomes an offset error of a bias value of the optical interferometric gyro. When the offset error is large, zero stability deteriorates because if any factor changes owing to an external disturbance or the like, the zero point will vary at a fixed rate.

As described above, when the input angular velocity is zero, the interference light is intensity modulated at the frequency twice higher than that $f_m$ of the modulation signal, and the interference light is split by the beam splitter 12 into two, one of which is supplied to the photodetector 21 and the other of which returns to the light source 11. Based on the interference light having thus returned to the light source 11, the light to be emitted therefrom is intensity modulated at the frequency twice that $f_m$ of the modulation signal. Alternatively, the interference light having thus returned to the light source is detected by a photo diode which is provided to control the quantity of light to be emitted from the light source 11, and an automatic quantity-of-light stabilizer operates to keep constant the quantity of light from the light source, including the detected output, so that the light from the light source 11 is intensity modulated at the frequency twice that $f_m$ of the modulation signal.

When the light from the light source 11, thus intensity modulated at the frequency $2f_m$, is intensity modulated by the phase modulation signal in the phase modulator 15, it is intensity modulated at frequencies $2f_m+f_m=3f_m$ and $2f_m-f_m=f_m$ by a frequency mixing effect of the modulation wave in the phase modulator 15. Thus, the interference light, into which the two light beams having passed through the phase modulator 15 are combined, also contains the intensity-modulated component of the frequency $f_m$, and as described previously, even if the input angular velocity is zero, the synchronous detector 22 yields an output, which becomes an offset error of the bias value.

It is an object of the present invention to provide an optical interferometric gyro in which even if intensity modulation by the phase modulator is present and even if the light from the light source is intensity modulated, no error is induced in the bias value and hence the bias zero stability can be enhanced accordingly.

Moreover, in the prior art the branching ratio of the beam splitter 12 for splitting the light emitted from the light source 11 is set to 1:1. Assuming that the loss by optical elements is zero and the quantity of light incident from the light source 11 is 100, the quantity of light which is branched to each of the polarizer 13 and the terminating element 20 is 50, and when the quantity of light 50 is split again by the beam splitter 12 after having propagated through the optical fiber coil 16, the quantity of light returning to the light source 11 and the quantity of light of the signal to the photodetector 21 are each 25. In this case, the signal-to-noise ratio of the optical system can be set to a large value, but the quantity of light returning to the light source 11 also becomes maximal, leading to the defect of deteriorated-performance of the optical interferometric gyro.

The light source 11 for use in the optical interferometric gyro is, in many cases, a light source which employs an optical resonator, such as a semiconductor laser. Usually, the semiconductor laser constitutes an optical resonator, using cleavage planes at both ends of the laser chip as reflectors, and utilizes, as laser light, light having resonated in the resonator. In the light source which utilizes the resonance of light, such as the semiconductor laser, if light reflected or returning from a portion other than the cleavage planes of the semiconductor laser chip is incident to the laser chip, another resonator will be formed in addition to that one formed by the semiconductor laser. This resonator is formed outside the semiconductor laser, and hence is called an external resonator. When the external resonator is formed, the spectral configuration, center wavelength and coherence of the light source undergo changes. It has been reported that such a phenomenon is caused also in a super luminescent diode (SLD) which is often used in the optical interferometric gyro.

The variation in the spectral configuration, center wavelength and coherence of the light source 11 are fatal to the optical interferometric gyro, and the variation in the center wavelength is particularly serious because it is related directly to a change in the scale factor of the optical interferometric gyro. The scale factor of the optical interferometric gyro is a function of the center wavelength of the light source 11, and hence the variation in the center wavelength leads to a change in the scale factor. Furthermore, the variation in the coherence of the light source 11 also poses a serious problem because it causes a change in the value of the bias error which is induced by reflected or scattered light in the optical interferometric gyro.

It is therefore another object of the present invention to provide an optical interferometric gyro which suppresses the variation in the center wavelength of the light source which causes a change in the scale factor and induces a bias error and the light returning to the light source which causes a variation in the coherence of the light source, and hence is small in the scale factor variation and in the bias error.

DISCLOSURE OF THE INVENTION

According to the present invention, as is the case with the prior art, a first phase modulator is connected in series between light coupler means and one end of a looped optical transmission line, and at the same time, a second phase modulator is connected in series to the first phase modulator. The second phase modulator may preferably have the same characteristics as those of the first phase modulator. A modulation signal which is supplied to the second phase modulator is of the same periodic function and the same frequency as those of the modulation signal to the first phase modulator, but in this instance, the phase of the modulation signal to the second phase modulator is selected so that each light beam having propagated through the looped optical transmission line is phase shifted by the second phase modulator in the same direction as that in which it is phase shifted by the first phase modulator. That is to say, letting the modulation signal to the first phase modulator be represented by $\phi(2\pi f_m t)$, the modulation signal to the second phase modulator is $\phi(2\pi f_m t - 2\pi \tau f_m)$.

In the above, $\tau$ is the time for light to propagate through the looped optical transmission line. A sine wave or rectangular wave is used as the periodic function $\phi(2\pi f_m t)$.

In the first and second phase modulators the clockwise and counterclockwise light beams are subjected to phase shifts which are added together, by which is produced the same effect as that of the phase modulation in the prior art. In addition, the intensity modulation in one of the first and second phase modulators is multiplied by the intensity in the other phase modulator; namely, the intensity modulation serves as frequency mixing. As the result of this, no component of the phase modulation frequency $f_m$ is contained in the intensity-modulated light having passed through the looped optical transmission line.

Moreover, according to the present invention, the branching ratio of the beam splitter whereby the interference light having returned from the looped optical transmission line is branched to the photodetector side and the light source side is selected such that the quantity of light to be branched to the photodetector side is larger than the quantity of light to the light source side. In other words, the branching ratio of the beam splitter is not 1:1 but it is chosen such that the ratio between the quantity of light to the light source side and the quantity of light to the photodetector side is, for example, in the range of 5:94 to 40:60, preferably, 20:80 to 30:70.

Since the beam splitter has such a branching ratio, the light from the light source is branched to the terminating element side more than to the looped optical transmission line side. Consequently, the quantity of light on the looped optical transmission line side decreases and the signal-to-noise ratio of the optical system becomes small; hence, the quantity of light from the light source is increased larger than in the prior art so that the signal-to-noise ratio is higher than a predetermined value, as required. On the other hand, the quantity of light which returns to the light source, such as the signal light (the interference light) having propagated through the looped optical transmission line, Rayleigh scattered light from each point in the optical fiber and reflected light from a fiber fusion-spliced point, can be reduced. It is therefore possible to suppress variations in the spectral configuration, center wavelength and coherence of the light source which are caused by the above-mentioned light which returns to the light source. This permits reduction of scale factor and bias errors which are induced by the variations in the characteristics of the light source.

DESCRIPTION OF THE PREFERRED EMBODIMENTS

Figure 3:
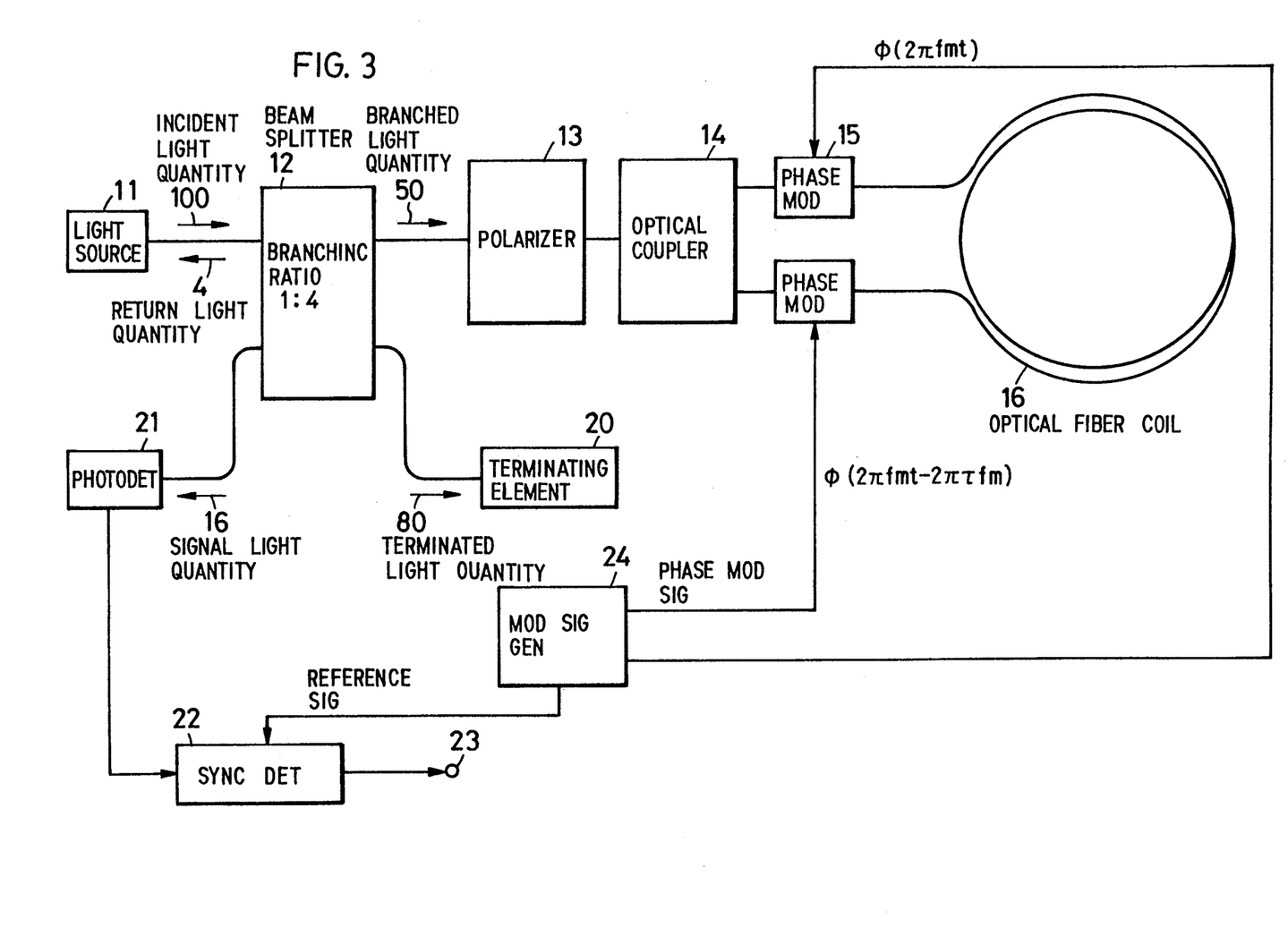
FIG. 3 is a block diagram illustrating an embodiment of the present invention applied to an open loop type optical interferometric gyro.

FIG. 3 illustrates an embodiment of the present invention, in which the parts corresponding to those in FIG. 1 are identified by the same reference numerals. According to the present invention, the light from the light source 11 is provided to a beam splitter 25 which has a branching ratio of 1:4 in this embodiment. The light is split by the beam splitter 25 into two, and the light of the smaller quantity is provided to the polarizer 13 side and the light of the large quantity is provided to the terminating element 20. The interference light having returned from the optical fiber coil 16 is incident to the beam splitter 25 and is branched to the light source 11 side and the photodetector 21 side.

In the present invention, the phase modulator 15 is connected in series between the optical coupler 14 and one end of the optical fiber coil 16, and at the same time, another phase modulator 26 is connected in series between the optical coupler 14 and the other end of the optical fiber coil 16 as well. Thus the phase modulator 26 is connected in series to the phase modulator 15 via the optical fiber coil 16. The phase modulator 26 is identical in characteristics with the phase modulator 15. In order that the clockwise light beam may be phase shifted by the phase modulator 26 in the same direction as that of the phase shift by the phase modulator 15, the phase modulator 26 is driven by a modulation signal which has the same periodic function and the same frequency as those of the modulation signal to the phase modulator 15 but lags behind the latter modulation signal by a phase $2\pi\tau f_m$. The modulation signal to the phase modulator 26 is also produced by the modulation signal generator 24. Letting the modulation signal for the phase modulator 15 be represented by $\phi(2\pi f_m t)$ and setting $f_m = 1/(2\tau)$ as shown in FIG. 2, the modulation signal for the phase modulator 25 is $\phi(2\pi f_m - \pi)$.

With such an arrangement as described above, the clockwise light beam is subjected to phase shifts by the phase modulators 15 and 26 which are added to each other, and the counterclockwise light beam is also subjected to phase shifts by the phase modulators 15 and 25 which are added to each other. The clockwise and counterclockwise light beams which are combined by the optical coupler 14 have a phase difference therebetween which varies with the periodic function $\phi(2\pi f_m t)$. As is the case with the prior art, the angular velocity input into the optical fiber coil 16 can therefore be detected by converting the interference light of the two light beams with the photodetector 21 into the electrical signal and then by synchronously detecting the electrical signal.

When passing through the phase modulator 15, the clockwise light beam is intensity modulated at the frequency $f_m$ and then the thus intensity-modulated clockwise light beam is further intensity modulated at the frequency $f_m$ when it passes through the phase modulator 26. That is, the intensity modulations are multiplied in the phase modulator 26, and the intensity-modulated frequency components are $f_m + f_m = 2f_m$ and $f_m - f_m = 0$. Consequently, no frequency component $f_m$ is included in the intensity-modulated frequency component of the clockwise light beam which has returned to the optical coupler 14. Similarly, no frequency component $f_m$ is included in the intensity-modulated frequency component of the counterclockwise light beam which has returned to the optical coupler 14, either. Hence, when the input angular velocity is zero, no frequency component $f_m$ is included in the light intensity changing component of the interference light of the clockwise and counterclockwise light beams, and the output of the synchronous detector 22 is zero at this time and no offset error is induced in the bias value. Thus, the optical interferometric gyro is free from an offset error and zero stability of its bias increases accordingly.

When the light from the light source 11 is intensity modulated at the frequency $2f_m$ as referred to above, the clockwise light beam is intensity modulated at the frequency $f_m$ when it passes through the phase modulator 15 and the intensity-modulated frequency components of the clockwise light beam are $2f_m+f_m=3f_m$ and $2f-f_m=f_m$. When passing through the phase modulator 26, the clockwise light beam is intensity modulated again at the frequency $f_m$ and its intensity-modulated frequency components after having passed through the phase modulator 26 are $3f_m-f_m=4f_m$, $3f_m-f_m=2f_m$, $f_m+f_m=2f_m$ and $f_m-f_m=0$. Thus, the frequency component $f_m$ disappears. Likewise, no frequency component $f_m$ is included in the intensity-modulated frequency components of the counterclockwise light beam having passed through the phase modulator 15. Consequently, when the input angular velocity is zero, the intensity-modulated frequency components of the interference light into which both light beams having returned to the optical coupler 14 are combined do not include the frequency component $f_m$ either and the output of the synchronous detector 22 is reduced to zero and zero stability of the bias of the optical interferometric gyro increases.

Assuming that the loss by the optical elements is zero and the quantity of light from the light source 11 is 100 in FIG. 3, the quantity of light branched to the polarizer 13 side is 20 and the quantity of light branched to the terminating element 20 is 80. In this instance, since the quantity of interference light having returned to the beam splitter is 20, the quantity of light returning to the light source 11 is 4 and the quantity of signal light to the photodetector 21 is 16. In this way, the quantity of light returning to the light source 11 is appreciably reduced to a value smaller than in the past, and consequently, the spectral configuration, center wavelength and coherence of the light source 11 become unlikely to vary accordingly and the variations in the scale factor and the bias of the fiber optic gyro also decrease.

Figure 4:
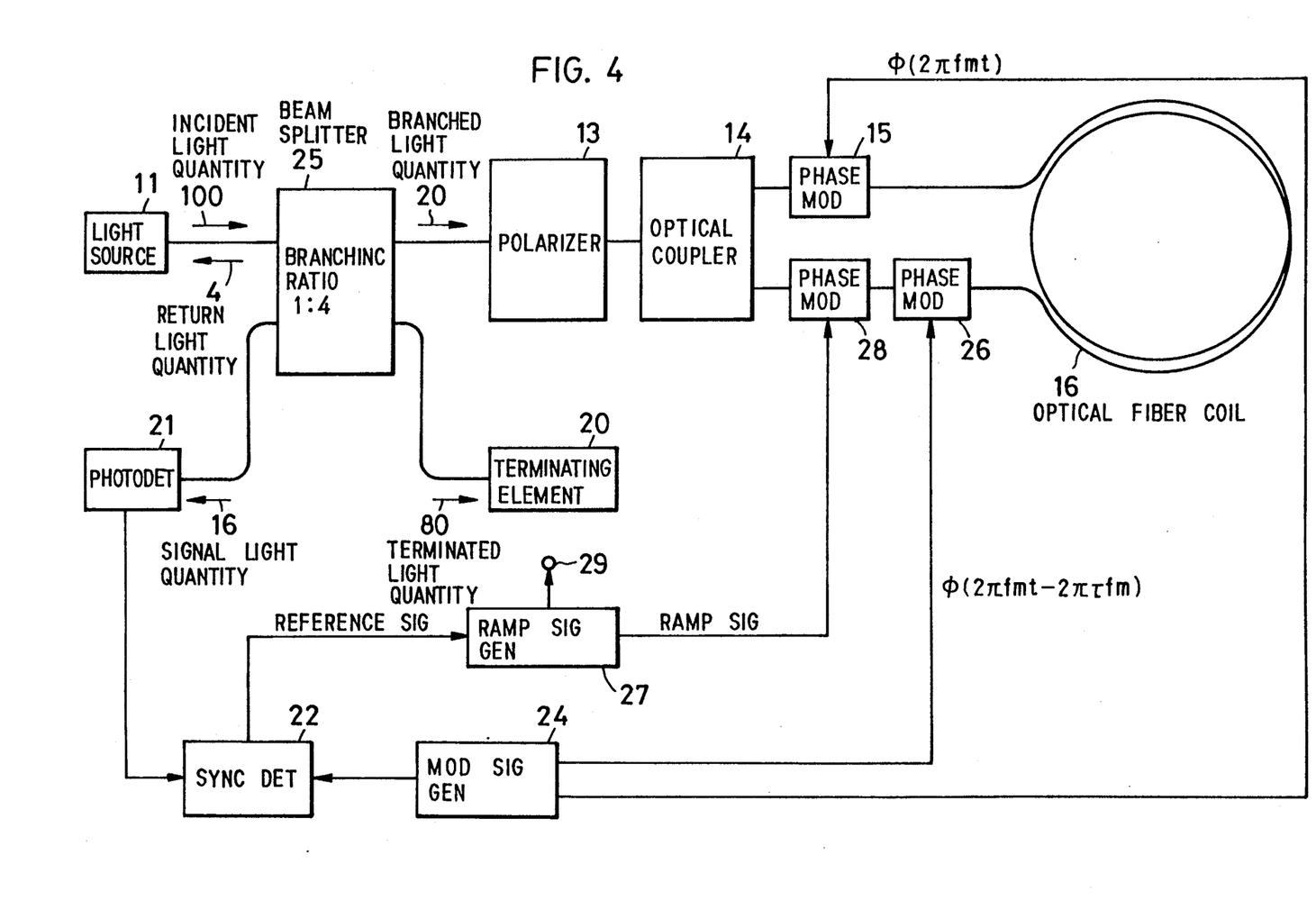
FIGS. 4 to 6 are block diagrams illustrating embodiments of the present invention applied to closed loop type optical interferometric gyros.

While the above relates to the present invention applied to an open loop type optical interferometric gyro, the invention is applicable to a closed loop type optical interferometric gyro as well. FIG. 4 illustrates an example of such an application, in which the parts corresponding to those in FIG. 3 are identified by the same reference numerals. The output of the synchronous detector 22 is applied to a ramp generator 27, which generates a ramp signal (which may sometimes be a stepwise ramp signal) in the direction of inclination corresponding to the polarity of the input and at an angle of inclination corresponding to the magnitude of the input. The ramp signal is used to phase control a phase modulator 28 connected in series between one end of the optical fiber coil 16 and the optical coupler 14, effecting negative feedback control so that the output of the synchronous detector 22 is reduced to zero. As a result, a ramp signal, which has a polarity corresponding to that of the input angular velocity and a frequency corresponding to the magnitude of the input angular velocity, is provided from the ramp generator 27 to an output terminal 29.

Figure 5:
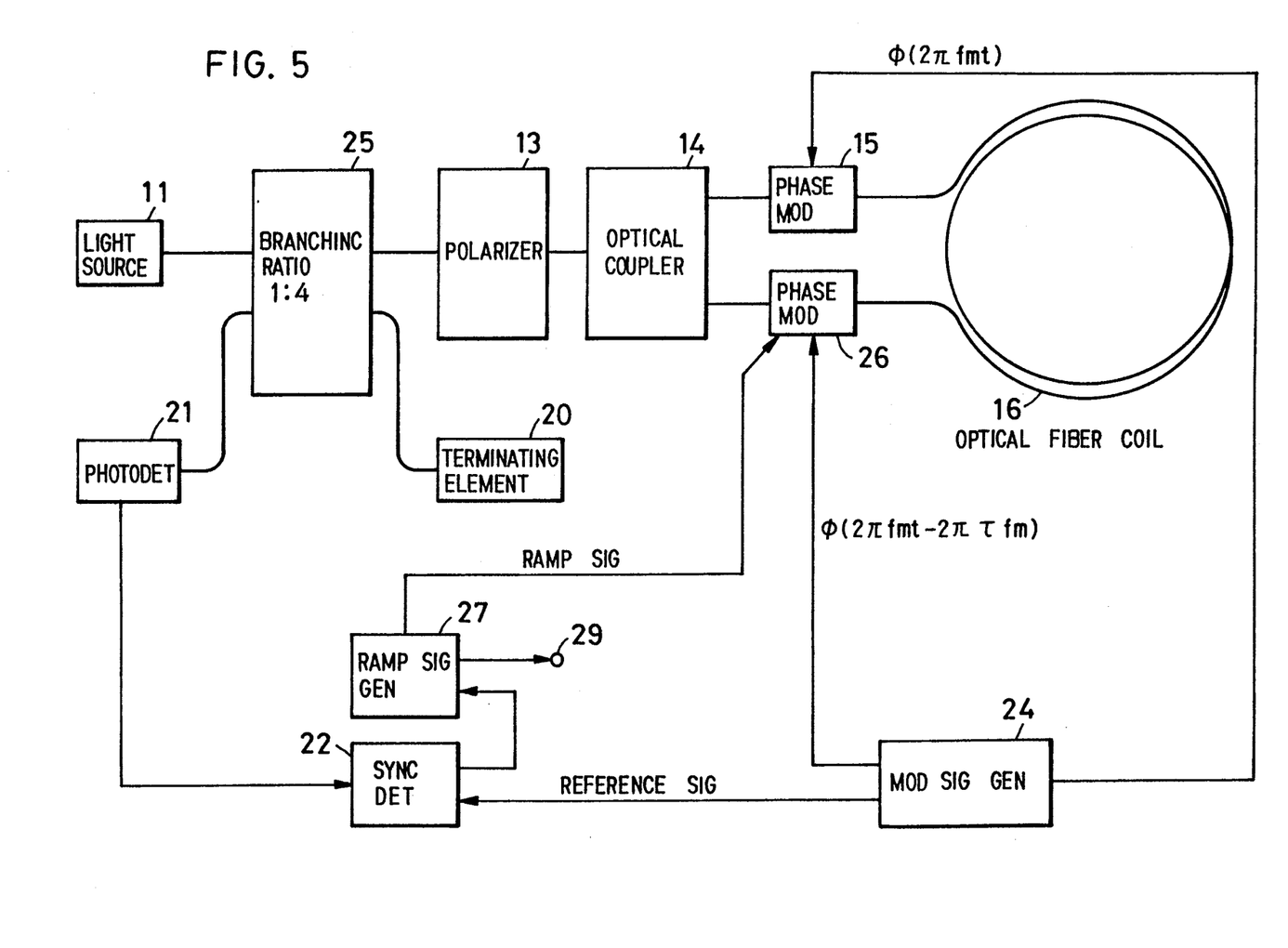
Figure 6:
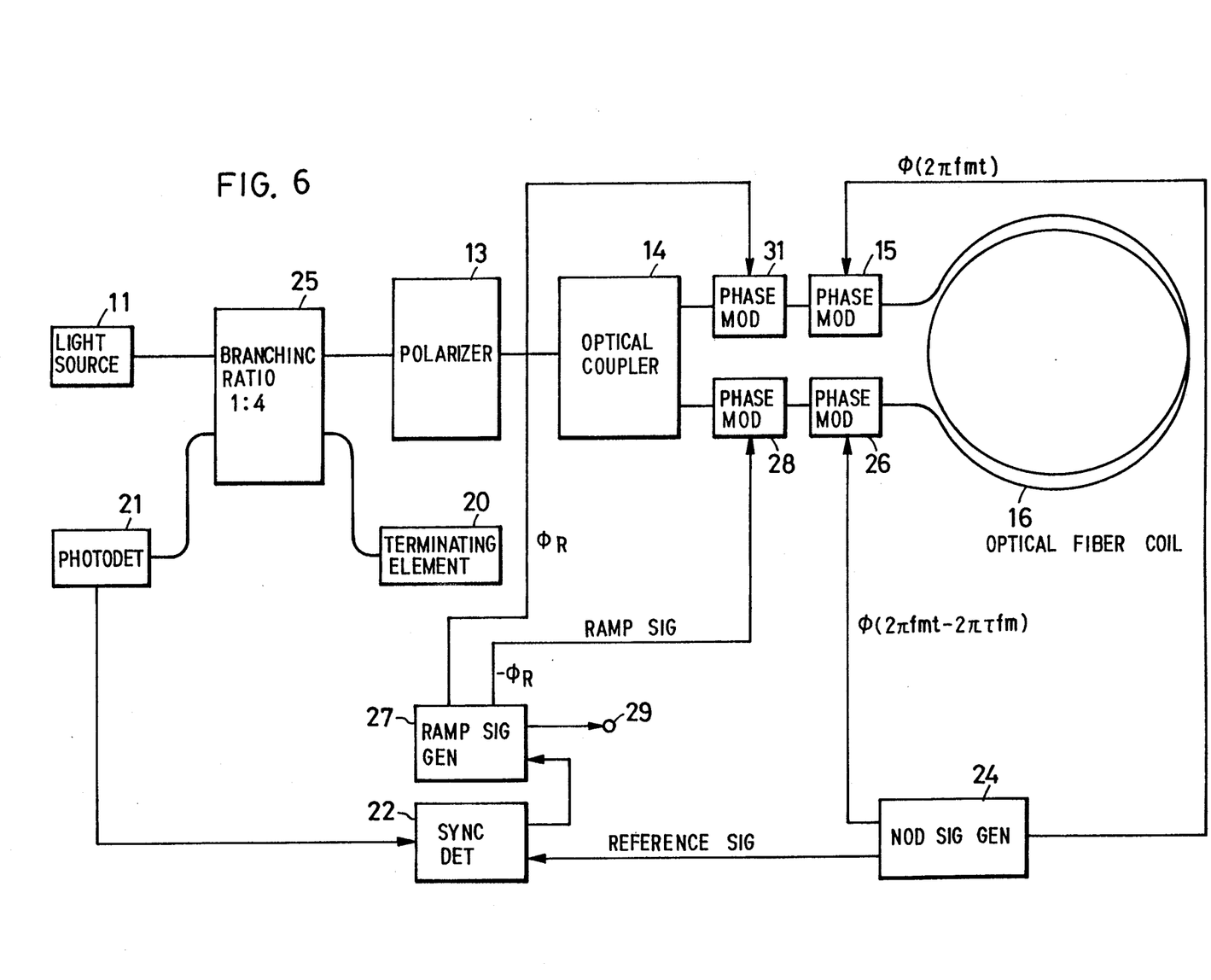

It is also possible to leave out the phase modulator 28 and apply the feedback ramp signal from the ramp generator 27 to the phase modulator 26 as shown in FIG. 5. Alternatively, the feedback ramp signal may be provided to the phase modulator 15. As shown in FIG. 6 wherein the parts corresponding to those in FIG. 4 are identified by the same reference numerals, it is also possible to employ an arrangement in which another phase modulator 31 is connected between the optical coupler 14 and one end of the optical fiber coil 16 and is driven by a ramp signal $\phi_R$ which is opposite in polarity to a ramp signal $-\phi_R$ for driving the phase modulator 28. In the constructions shown in FIGS. 4 and 5, the peak value of the feedback ramp signal is a voltage value necessary for imposing a $2\pi$ rad phase shift on light, but in the arrangement of FIG. 6 the peak value of the feedback ramp signal needs only to be a voltage value necessary for imposing a $\pi$ rad phase shift on light, that is, the required voltage is low and the design of the ramp generator 27 is easy.

Figure 7:
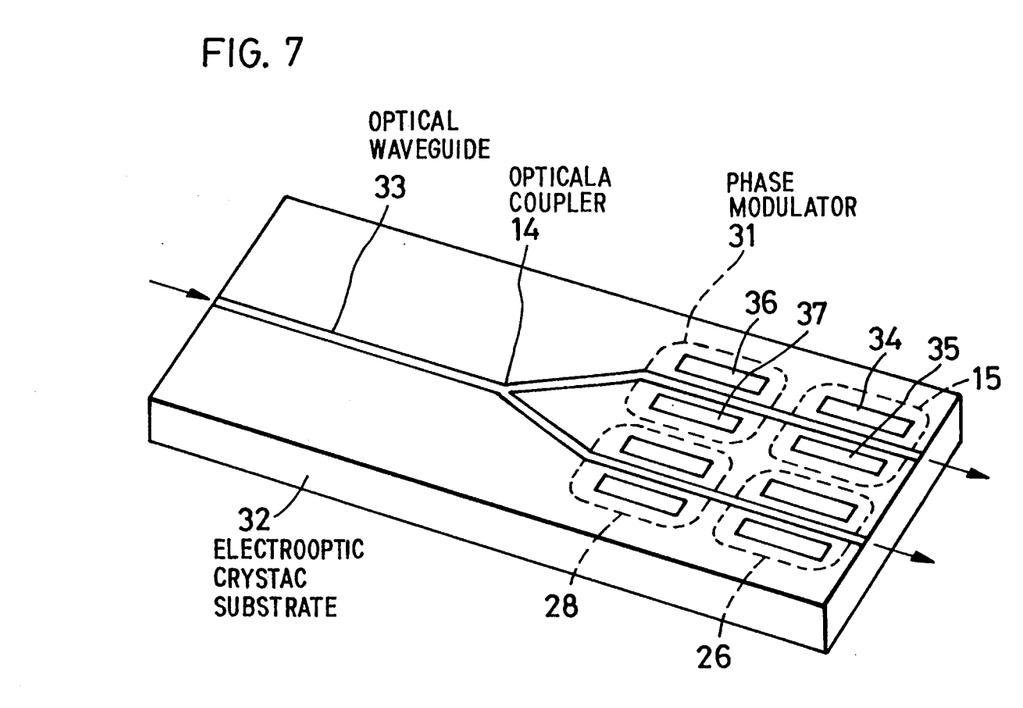
FIG. 7 is a perspective view showing an example of integration of phase modulators 15, 26, 28 and 31 in FIG. 6.

The four phase modulators 15, 26, 28 and 31 in FIG. 6 can be integrated on one substrate. As depicted in FIG. 7, an optical waveguide 33 is provided in a Y-letter shape on an electrooptic crystal substrate 32 as of lithium niobate to form the optical coupler 14; electrodes 34 and 35 are provided on both sides of one of the two branched optical waveguides to form the phase modulator 15; electrodes 36 and 38 are provided on both sides of the above-said one branched optical waveguide to form the phase modulator 31; and two pairs of electrodes are similarly provided on both sides of the other branched optical waveguide to form the phase modulators 26 and 28. In the arrangement of FIG. 6 it is also possible to omit the phase modulators 28 and 31 and supply the feedback ramp signals $\phi_R$ and $-\phi_R$ to the phase modulators 15 and 26, respectively.

Figure 8:
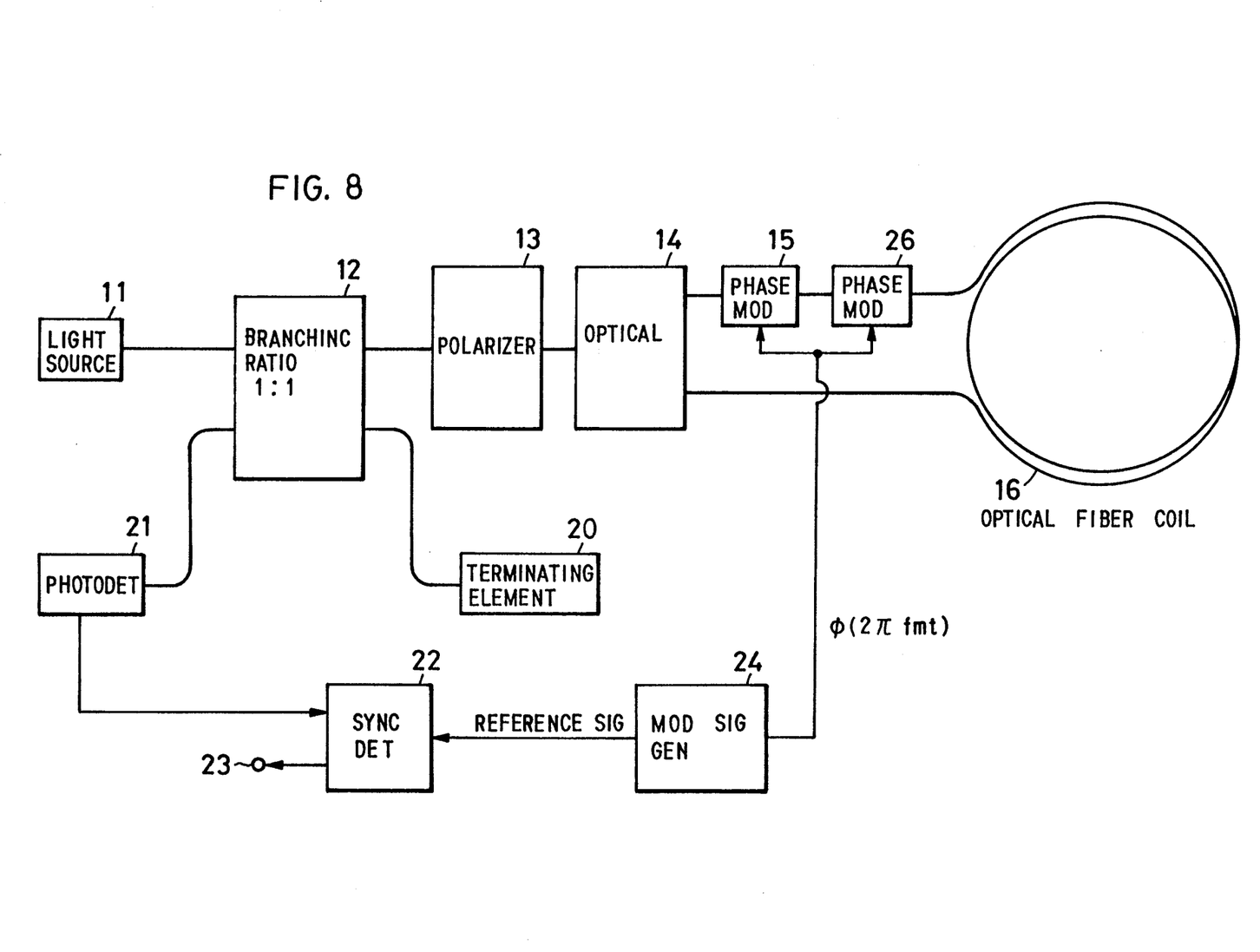
FIG. 8 is a block diagram illustrating another embodiment of the present invention applied to the open loop type optical interferometric gyro.

Although in the above the phase modulator 26 is connected in series to the phase modulator 15 via the optical fiber coil 16, the phase modulator 26 may also be connected in series directly to the phase modulator 15. In FIG. 8 an example of such an arrangement is shown as being applied to an open loop type optical interferometric gyro, in which the parts corresponding to those in FIG. 3 are identified by the same reference numerals, and therefore no description will be given of them.

The beam splitter 25 may be what is called a bulk type beam splitter using a prism, an optical fiber coupler formed by polishing claddings of two optical fibers and joining them to couple the two optical fibers, an optical fiber coupler formed by fusing two optical fibers and stretching them together, an optical directional coupler formed by an optical waveguide, or a double-Y type beam splitter formed by optical waveguides.

In FIGS. 3 to 6 and 8 the beam splitter 25 may be replaced by the beam splitter 12 having the 1:1 branching ratio shown in FIG. 1; also the phase modulator 26 may be omitted.

As described above, according to the present invention, the second phase modulator, which is connected in series to the first phase modulator connected between the optical coupler and one end of the looped optical transmission line, is driven by a modulation signal of the same frequency as that of the modulation signal for the first phase modulator. By this, the offset error of the bias value of the optical interferometric gyro, based on the light intensity modulation by the second phase modulator can be reduced to zero, and also when the light from the light source is intensity-modulated, it is possible to prevent the offset error of the bias value based on the intensity modulation. This permits an increase in the quantity of light to be emitted from the light source and enables the SN ratio to be increased. Thus the present invention offers a highly stable optical interferometric gyro of a small offset of its bias value.

Moreover, the branching ratio of the beam splitter, whereby the light from the light source is branched to the looped optical transmission line side and the interference light of the clockwise and counterclockwise light beams having returned from the looped optical transmission line is branched to the photodetector side and the light source side, is selected such that the quantity of interference light to be branched to the photodetector side is larger than the quantity of interference light to the light source side. Consequently, the quantity of light returning to the light source is small and the characteristics of the light source, such as the spectral configuration, center wavelength and coherence of the light source, vary less than in the past. This decreases the scale factor change and the bias error of the optical interferometric gyro.

I claim:

1. An optical interferometric gyro in which light from a light source is split by a first optical coupler into two light beams, one of the said light beams is further split by a second optical coupler into two light beams, one of said second-mentioned two light beams is provided as a clockwise light beam to one end of a looped optical transmission line, the other light beam is provided as a counterclockwise light beam to the other end of said looped optical transmission line, said clockwise and counterclockwise light beams having passed through said looped optical transmission line are combined by said second optical coupler to interfere with each other, the interference light is branched by said first optical coupler to said light source and a photodetector, and an angular velocity applied to said looped optical transmission line about its axis is detected from the output of said photodetector, characterized in that the branching ratio of said first optical coupler is selected such that the quantity of light to be branched to said photodetector is larger than the quantity of light to be branched to said light source.

2. The optical interferometric gyro of claim 1 wherein first phase modulating means is connected in series between said second optical coupler and one end of said looped optical transmission line, said first phase modulating means is driven by a modulation signal of a periodic function to phase modulate light passing through said first modulating means, the output of said photodetector is synchronously detected by said modulating signal in a synchronous detector, a ramp signal is generated by a ramp signal generator in accordance with the synchronously detected output, and second phase modulating means connected in series between one end of said looped optical transmission line and said second optical coupler is driven by said ramp signal so that said synchronously detected output is reduced to zero.

3. The optical interferometric gyro of claim 1 or 2 wherein the branching ratio of said second optical coupler is 2:8 to 3:7.

* * * * *